(12) United States Patent
Mouleyre et al.

(10) Patent No.: US 10,377,348 B2
(45) Date of Patent: Aug. 13, 2019

(54) MEMBER FOR A SYSTEM FOR CONNECTING A WIPER BLADE TO A WINDSCREEN WIPER ARM

(71) Applicant: Valeo Systèmes d'Essuyage, Le Mesnil Saint Denis (FR)

(72) Inventors: Guillaume Mouleyre, Saint Genès Champanelle (FR); William Terrasse, Vic-le-Comte (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/195,239

(22) Filed: Jun. 28, 2016

(65) Prior Publication Data

US 2016/0375866 A1 Dec. 29, 2016

(30) Foreign Application Priority Data

Jun. 29, 2015 (FR) ...................... 15 56018

(51) Int. Cl.
*B60S 1/38* (2006.01)
*B60S 1/40* (2006.01)

(52) U.S. Cl.
CPC ........... *B60S 1/3851* (2013.01); *B60S 1/3849* (2013.01); *B60S 1/4003* (2013.01); *B60S 1/4038* (2013.01); *B60S 1/4048* (2013.01); *B60S 1/407* (2013.01)

(58) Field of Classification Search
CPC .... B60S 1/3851; B60S 1/4038; B60S 1/4048; B60S 1/4041; B60S 1/4045; B60S 1/4064;
(Continued)

(56) References Cited

U.S. PATENT DOCUMENTS

| 7,774,892 B2 * | 8/2010 | Coughlin | B60S 1/4038 15/250.32 |
| 2003/0074762 A1 * | 4/2003 | De Block | B60S 1/38 15/250.32 |

(Continued)

FOREIGN PATENT DOCUMENTS

| EP | 2505440 A2 * | 10/2012 | ............ B60S 1/3862 |
| FR | 2486890 A2 * | 1/1982 | ............ B60S 1/3801 |
| FR | 2994146 A1 | 2/2014 | |

OTHER PUBLICATIONS

FR2486890A2 (machine translation), 1982.*
Preliminary Report and Written Opinion Issued in Corresponding French Application No. 1556018, dated May 2, 2016 (6 Pages).

*Primary Examiner* — Andrew A Horton
(74) *Attorney, Agent, or Firm* — Osha Liang LLP (57) ABSTRACT

The invention relates to a member 24, 26 for a system for connecting a wiper blade 12 to a windscreen wiper arm 14, this member comprising articulation means 80 configured in order to interact with first means 60 complementing a second member 26, 24 of the connection system in such a manner as to turn about at least one axis Y of articulation of the member vis-à-vis this second member, said member comprising centring and guide means 62, 82 configured in order to interact with second means 82, 62 complementing the second member in order to facilitate the mounting of the member in or on the second member, characterized in that said centring and guide means 62, 82 comprise at least two distinct and contiguous portions 62a, 62b, 82a, 62b.

12 Claims, 6 Drawing Sheets

(58) Field of Classification Search
CPC ...... B60S 2001/4051; B60S 2001/4054; B60S 2001/4058; B60S 2001/4061
USPC ...................................................... 15/250.32
See application file for complete search history.

(56) References Cited

U.S. PATENT DOCUMENTS

| | | | |
|---|---|---|---|
| 2006/0059647 A1* | 3/2006 | Ostrowski | B60S 1/3868 15/250.32 |
| 2006/0248675 A1* | 11/2006 | Vacher | B60S 1/3849 15/250.32 |
| 2008/0289135 A1* | 11/2008 | Mayer | B60S 1/40 15/250.32 |
| 2010/0024149 A1* | 2/2010 | Erdal | B60S 1/3868 15/250.32 |
| 2010/0154158 A1* | 6/2010 | Boland | B60S 1/3848 15/250.32 |
| 2012/0060316 A1* | 3/2012 | Avasiloaie | B60S 1/381 15/250.33 |
| 2012/0110773 A1* | 5/2012 | Thielen | B60S 1/4003 15/250.32 |
| 2012/0167326 A1* | 7/2012 | Egner-Walter | B60S 1/3805 15/250.01 |
| 2012/0246860 A1* | 10/2012 | Schaeuble | B60S 1/4048 15/250.32 |
| 2013/0185889 A1* | 7/2013 | Tolentino | B60S 1/407 15/250.32 |
| 2013/0239356 A1* | 9/2013 | Yoshimoto | B60S 1/3863 15/250.38 |
| 2014/0053361 A1 | 2/2014 | Amano | |
| 2014/0215747 A1* | 8/2014 | Yang | B60S 1/4003 15/250.32 |
| 2014/0366303 A1* | 12/2014 | Thebault | B60S 1/40 15/250.32 |
| 2015/0135466 A1 | 5/2015 | Foss | |
| 2015/0151718 A1* | 6/2015 | Moll | B60S 1/4048 15/250.32 |

* cited by examiner

MEMBER FOR A SYSTEM FOR CONNECTING A WIPER BLADE TO A WINDSCREEN WIPER ARM

TECHNICAL FIELD

The present invention relates in particular to a member for a system for connecting a blade to a windscreen wiper arm, in particular of a motor vehicle.

PRIOR ART

A motor vehicle is conventionally equipped with windscreen wipers for washing the windscreen and avoiding disruption to the driver's view of his surroundings. These windscreen wipers generally comprise a driving arm that carries out an angular back-and-forth movement and have elongate blades which themselves carry squeegee blades made of a resilient material. These squeegee blades rub against the windscreen and evacuate the water by removing it from the driver's field of view. The blades are produced in the form either, in a conventional version, of articulated brackets which hold the squeegee blade at a number of discrete locations, giving it a bend that allows it to follow whatever curvature the windscreen may have, or, in a more recent version, known as the 'flat blade' version, of a semi-rigid assembly which holds the squeegee blade along its entire length by virtue of one of one or more bend-forming vertebrae making it possible to press the blade against the windscreen without having to use brackets.

In this latter solution, the blade is attached to the driving arm by a connection system having a connector and an adapter. The connector is a piece that is secured to the blade, whereas the adapter is secured to the arm. The adapter is an intermediate piece which allows the connector to be linked and fastened to the driving arm.

The connector and the adapter each comprise articulation means configured in order to interact with complementary means of the other member so as to define at least one transverse pivoting axis of the connector vis-à-vis the adapter. In the current art, one of the members generally comprises a substantially cylindrical physical axis which defines the articulation axis and is received in a hole of complementary shape in the other member.

In order to facilitate the mounting of the physical axis of one of the members in the hole of the other member, it is known to make provision on one of the members for centring and guide means configured in order to interact with complementary means of the other member. These centring means generally comprise numerous bearing and sliding surfaces that, on account, in particular, of the manufacturing and mounting clearances, do not interact efficiently with one another and limit the usefulness of these centring means.

The invention proposes a simple, effective and economical solution to this problem, which relates to a member of a connection system, and may, without distinction, be applied to a connector or to an adapter or even to both.

SUMMARY OF THE INVENTION

The invention relates to a member for a system for connecting a wiper blade to a windscreen wiper arm, this member comprising articulation means configured in order to interact with first means complementing a second member of the connection system in such a manner as to turn about at least one axis of articulation of the member vis-à-vis this second member, said member comprising centring and guide means configured in order to interact with second means complementing the second member in order to facilitate the mounting of the member in or on the second member, characterised in that said centring and guide means comprise at least two distinct and contiguous portions.

These contiguous and distinct portions facilitate the insertion of one member on the other and limit the forces generated on the adapter when the latter is inserted on the connector.

According to one aspect of the invention, the portions are each formed by a flat forming a sliding surface. In the present application, 'sliding surface' is understood to mean a surface that is configured in order to interact by sliding with a surface or a complementary means of another element, in particular at the time of mounting. This is thus a functional surface, not a simple connection surface.

According to an exemplary embodiment, two flats are adjacent and inclined relative to one another.

According to one embodiment, the centring and guide means comprise solely two distinct and contiguous portions.

It will be noted that the portions extend in distinct planes, forming, for example, a notch or a chamfer having a section substantially in the form of an upright or inverted V.

When the portions form at least one notch that in section is substantially in the form of an upright V, its two adjacent portions are inclined relative to one another by an angle of between 30 and 170°, and preferably between 120 and 160°. In this case, these portions are formed by a wiper blade connector.

When the portions form at least one chamfer that in section is substantially in the form of an inverted V, its two adjacent portions are inclined relative to one another by an angle of between 190 and 330°, and preferably between 200 and 240°. In this case, these portions are formed on an adapter interposed between a wiper blade connector and a windscreen wiper arm terminal piece.

Advantageously, the portions are located on a ridge of said member.

According to one embodiment, the portions are located in the vicinity of a hole or of a protuberance constituting articulation means, the hole being provided on a connector whereas the protuberance or protuberances is or are provided on an adapter.

The centring and guide means comprise two pairs of portions that are symmetrical relative to a first, longitudinal median plane of the member.

According to an exemplary embodiment, the centring and guide means comprise two pairs of portions that are symmetrical relative to a second, transverse median plane of the member.

It will be noted that the first plane is perpendicular to said axis of articulation and a second plane passes via the axis of articulation.

According to an exemplary embodiment, the member is a connector configured in order to be secured to said wiper blade or an adapter configured in order to be secured to the windscreen wiper arm.

The invention also relates to a system for connecting a wiper blade to a windscreen wiper arm, this system comprising two members, one of which is configured in order to be secured to said wiper blade and the other is configured in order to be secured to said windscreen wiper arm, characterised in that at least one of the members, and preferably both where one is a connector and the other is an adapter, is such as defined according to any one of the features set forth above.

The invention likewise covers a wiper blade, characterised in that it comprises at least one member, and preferably two members, one of which is a connector and the other is an adapter, according to one of the features set forth above, or a system according to the preceding paragraph.

DESCRIPTION OF FIGURES

The invention will be better understood and further details, features and advantages of the invention will become apparent from reading the following description given by way of non-limiting example and with reference to the appended drawings, in which.

DETAILED DESCRIPTION

It should be noted that the figures explain the invention in detail for implementing the invention, it being, of course, possible for said figures to serve to better define the invention if necessary.

In the following description, the terms 'longitudinal' or 'lateral' refer to the orientation of the wiper blade or of the driving arm, otherwise called the windscreen wiper arm. The longitudinal direction corresponds to the main axis of the wiper blade or windscreen wiper arm along which it extends, while the lateral orientations correspond to concurrent straight lines, that is to say straight lines which cross the longitudinal direction, notably perpendicular to the longitudinal axis of the wiper blade or windscreen wiper arm in the plane in which it rotates. For longitudinal directions, the terms 'exterior' (or 'rear') or 'interior' (or 'front') are to be viewed from the point at which the wiper blade is fastened to the windscreen wiper arm, the term 'interior' corresponding to the part where the windscreen wiper arm and a half-blade extend. Finally, the directions referenced as 'upper' or 'lower' correspond to orientations perpendicular to the plane of rotation of the windscreen wiper blade, the term 'lower' containing the plane of the windscreen.

Figure 1:
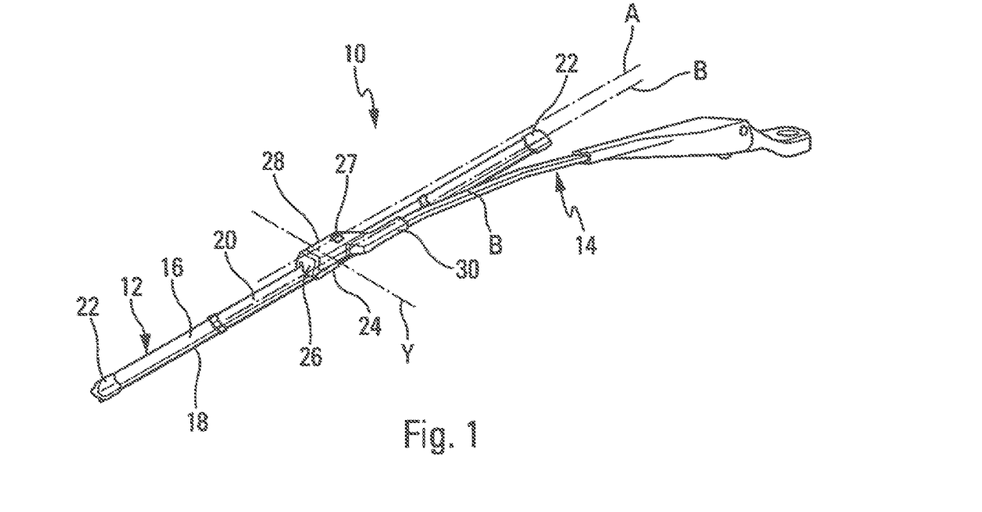
FIG. 1 is a schematic perspective view of a windscreen wiper, this windscreen wiper having a wiper blade and an arm for driving the wiper blade, which are connected to one another by a connection system.

FIG. 1 illustrates a windscreen wiper 10 comprising notably a wiper blade 12 and a windscreen wiper driving arm 14 for driving the wiper blade 12.

The wiper blade 12 is preferably of the flat-blade type and comprises a longitudinal body 16, a squeegee blade 18, generally made of rubber, and at least one vertebra (not visible) which stiffens the squeegee blade and distributes a pressing force of the windscreen wiper arm 14 so as to encourage the wiper blade 12 to press against a vehicle windscreen.

The body 16 of the wiper blade 12 may comprise an upper aerodynamic deflector 20 intended to improve the operation of the wiping system, the purpose of this deflector being to improve the pressing of the wiper blade against the windscreen and therefore the aerodynamic performance of the windscreen wiper.

The wiper blade 12 may further comprise end fittings 22 or clips for attaching the squeegee blade 18 and the vertebra to the body 16, these fittings 22 being situated at each of the longitudinal ends of the body 16.

The wiper blade 12 comprises, substantially at its middle, a connector 24. An adapter 26 secured to the windscreen wiper arm 14 is mounted on the connector 24 so as to maintain a degree of freedom to pivot about an axis Y of articulation which is a transverse axis substantially perpendicular to the longitudinal axis of the wiper blade 12. This degree of freedom allows the wiper blade 12 to pivot vis-à-vis the windscreen wiper arm 14 and thus allows the wiper blade to follow the curvature of the windscreen as it moves. The adapter 26 can be detached from the windscreen wiper arm 14 by pressing an actuation button, in this case a push button 27, carried by the adapter.

The windscreen wiper arm 14 is intended to be driven by a motor to follow an angular back-and-forth movement that allows water and possibly other undesirable elements with which the windscreen is covered to be evacuated. The adapter 26 provides the connection of the wiper blade 12 to the windscreen wiper arm 14 and, in particular, to a head or terminal piece 28 of the windscreen wiper arm which may be formed as one piece with a core of the windscreen wiper arm or attached and fastened thereto.

In the example shown, the terminal piece 28 of the windscreen wiper arm forms a yoke having a transverse section substantially in the form of a U.

The terminal piece 28 has an elongate shape, the axis of elongation A of which is generally substantially parallel to the axis of elongation or longitudinal axis of the wiper blade 12. The terminal piece 28 comprises a part 30 for connecting to the rest of the windscreen wiper arm 14, for example by crimping. This part 30 has an elongate overall shape and extends along an axis B substantially parallel to the axis A and spaced apart from this axis, as can be seen in FIG. 1. The part 30 is connected to a rear or interior end of the rest of the terminal piece 28.

The adapter 26 is of the 'universal' type and is designed to be mounted, without distinction, on different terminal pieces 28 of windscreen wiper arms, even on windscreen wiper arms not equipped with terminal pieces, otherwise called rod arms, as will be described below in greater detail with reference to FIG. 13 or 14.

FIGS. 2 to 10 show an embodiment of a member according to the invention. In a first situation, such a member may be formed by the adapter 26. According to a second situation, the member of the invention may be formed by the connector 24. Lastly, and according to a third situation, the invention is formed by a system for connecting the wiper blade 12 to the windscreen wiper arm 14, or to a windscreen wiper arm 14 amongst a plurality of types of windscreen wiper arms, which incorporates two members, a first member being an adapter 26 as described, and a second is a connector 24 as described.

Figure 2:
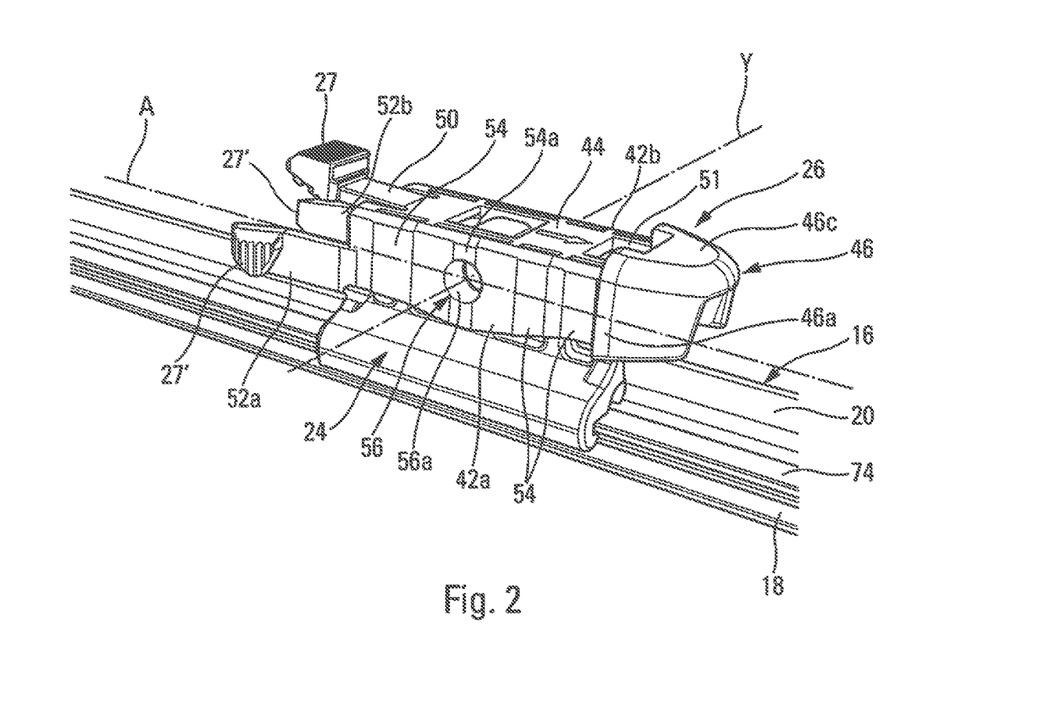
FIG. 2 is a schematic perspective view of a wiper blade equipped with a connection system according to the invention.
Figure 6:
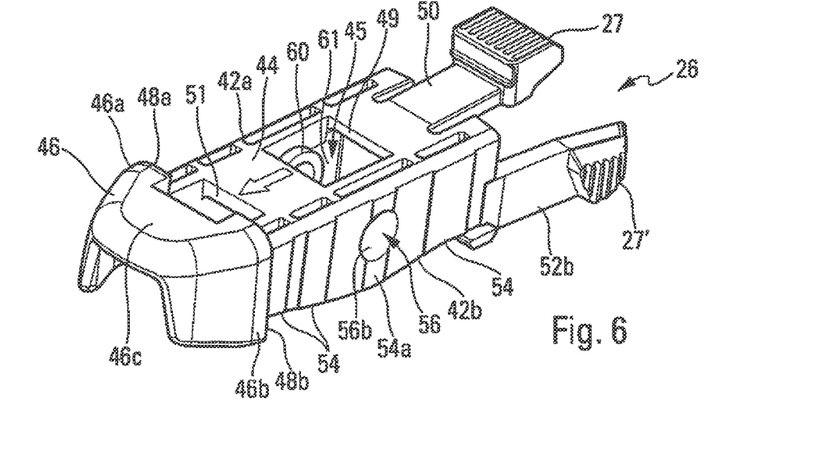
FIGS. 6 and 7 are schematic perspective views of the adapter of the connection system of FIG. 2, FIGS. 8 and 9 are partial schematic views of the connector and adapter of FIGS. 3 to 7 on a larger scale.
Figure 7:
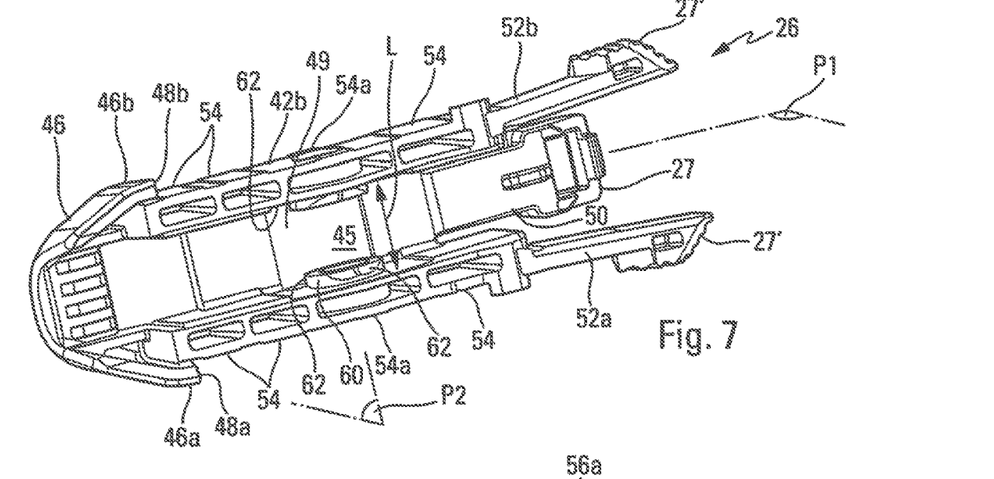

The adapter 24 has an elongate overall form along the axis A. It comprises a body having two lateral walls 42a, 42b which are substantially parallel to one another and to the axis A, and at a distance from one another. These walls 42a, 42b are connected together at their upper ends by an upper transverse wall 44 substantially perpendicular to the walls 42a, 42b. This upper transverse wall 44 may also be called the base of the adapter 24. The lateral and transverse walls 42a, 42b and 44 here have an elongate shape in the longitudinal direction.

The upper lateral and transverse walls 42a, 42b, 44 of the adapter 26 between them define a longitudinal space 45, in which a part of the connector 24 is designed to be mounted. The walls 42a, 42b are, here, of the double-skin type and each comprise two skins, an internal skin and an external skin, respectively, which are parallel to and at a transverse distance from one another. The skins are connected together by transverse rectilinear ribs.

The body of the adapter 26 is connected, at a first of its longitudinal ends, to a fairing or cowling, also called a cap or head 46. This head 46 has a lateral dimension greater than that of the body of the adapter and a height that is likewise greater than that of the body. The lateral walls 42a, 42b of the body of the adapter 26 are thus set back or offset relative to external lateral faces 46a and 46b of the head, and its upper wall 44 is set back or offset relative to an external upper face 46c of the head.

The lateral faces 46a, 46b of the head 46 are connected to the lateral walls 42a, 42b of the body by lateral rear faces 48a, 48b, which extend substantially perpendicularly to the axis A. The upper face 46c of the head 46 is separated from the upper wall 44 of the body by a hole or orifice 51, which serves to receive a tongue of a driving arm.

The lateral and upper rear faces 48a, 48b of the head 46 form bearing faces of the exterior or front end of the terminal piece 28. More precisely, in the mounted position of the adapter in the terminal piece 28, front free edges of the lateral legs of the terminal piece are designed to come to bear on the lateral rear faces 48a and a front free edge of the transverse wall of the terminal piece 28 is designed to come to bear on the upper rear face 48b of the head 46.

The upper wall 44 of the body of the adapter 26 comprises, substantially at its middle, a window 49. The upper wall 44 comprises, at its longitudinal end opposite the head 46, longitudinal slots that are parallel to one another and to the axis A and spaced apart from one another in such a manner as to define between them at least one portion of a longitudinal tongue 50. The window 49 is, for example, provided above the pivoting means provided between the adapter 26 and the connector 24.

The tongue 50 extends longitudinally from a portion of the adapter opposite the head 46. This tongue 50 extends, for example, in the continuation of the upper wall 44. This tongue extends in particular in a direction head 46 towards pivoting means. It is elastically deformable and is connected at its exterior or front free end to the aforementioned upper push button 27 that projects from the tongue 50. In the free state, without constraint, the tongue 50 is such that the push button 27 is located above a plane passing via the upper wall 44. Elastic deformations of the tongue 50 occur, here, in a substantially vertical, in particular median, longitudinal plane, i.e. substantially perpendicular to the upper wall 44. The adapter 26 is thus equipped with an upper push button 27.

When the adapter 26 is mounted in the terminal piece 28, the push button 27 is intended to be engaged by elastic snap-fitting in an aperture 38 (FIGS. 11 & 12) in order to lock the adapter vis-à-vis the terminal piece 28.

The adapter 26 further comprises an upper hole 51 for engagement of a tab in a particular type of terminal piece of a windscreen wiper arm. Here, this upper hole 51 is formed in part in the head 46, at the rear end thereof, and in part in the upper wall 44, at the front end thereof. The hole 51 has, for example, a square or rectangular overall shape.

The lateral walls 42a, 42b of the body continue towards the interior, or rear, of the adapter 26, by means of tabs 52a, 52b which are elastically deformable and extend longitudinally. Each lateral wall 42a, 42b is connected to a tab 52a, 52b, these tabs 52a, 52b being parallel or inclined relative to one another and symmetrical relative to a substantially vertical median longitudinal plane, i.e. perpendicular to the upper wall 44 of the adapter. The free ends of the tabs 52a, 52b, which are located on the side opposite the head 46, each carry a projecting lateral push button 27'. Each tab 52a, 52b thus carries a push button 27". Elastic deformations of the tabs 52a, 52b occur, here, in a substantially horizontal longitudinal plane, i.e. substantially parallel to the upper wall 44. The tabs 52a, 52b may be brought closer together by elastic deformation. The push buttons 27" are formed in order to interact with notches of the terminal piece 28, as will be described in greater detail below.

The lateral walls 42a, 42b each comprise a through-hole 56. The holes 56 in the walls 42a, 42b are substantially coaxial and, here, define the axis Y of pivoting of the adapter 26 on the connector 24 and thus of the wiper blade vis-à-vis the windscreen wiper arm. The holes 56 are, here, circular in section and each comprise a substantially cylindrical internal surface 56a. The holes 56 open at their external lateral ends on external faces of the walls 42a, 42b, respectively, and at their internal lateral ends in the longitudinal space 45.

The internal lateral faces 61 and 62 delimit the lateral walls 42a, 42b on the side of the longitudinal space 45 and each form a protuberance 60. The adapter thus comprises two protuberances. These protuberances thus project from each internal lateral face 61 and 62. Each lateral wall 42a, 42b thus comprises a protuberance 60, the protuberances here being opposite one another and extending substantially towards one another. The protuberances 60 are symmetrical relative to a median longitudinal plane of the adapter, perpendicular to the upper wall 44. Each protuberance 60 also has a plane of symmetry passing via the axis Y and perpendicular to the axis A.

Each protuberance 60 has an orifice and comprises in particular a through-orifice. This orifice is, here, formed by one of the aforesaid holes 56. Each protuberance 60 is thus located on the internal face of the lateral wall 42a or 42b so as to be traversed by the hole 56 of this wall.

Each protuberance 60 has a cylindrical and, here, tubular general shape on account of the hole 56 traversing it. The axis of each hole 56, which is merged with the axis Y, is likewise merged with the axis of the corresponding cylindrical protuberance 60, such that the hole is centred vis-à-vis the protuberance. Each protuberance 60 thus forms an annular bead of material around the hole 56, having, substantially, a radial thickness relative to the axis Y that is substantially constant. Each protuberance 60 has an axial dimension along the axis Y that represents approximately 10 to 20% of the axial dimension or width along the axis Y of the longitudinal space 45 delimited by the lateral walls 42a, 42b and by the upper wall 44. Each protuberance 60 has an external diameter that represents approximately 60 to 80% of the height of the corresponding lateral wall 42a, 42b, measured in a substantially vertical direction perpendicular to the upper wall 44.

Figure 8:
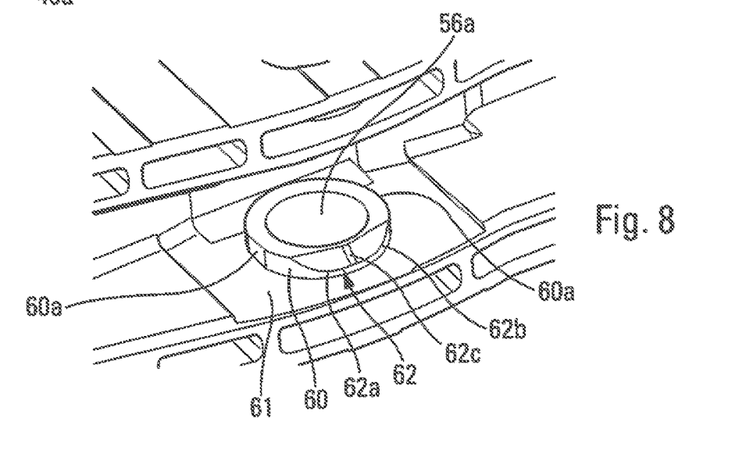
Figure 9:
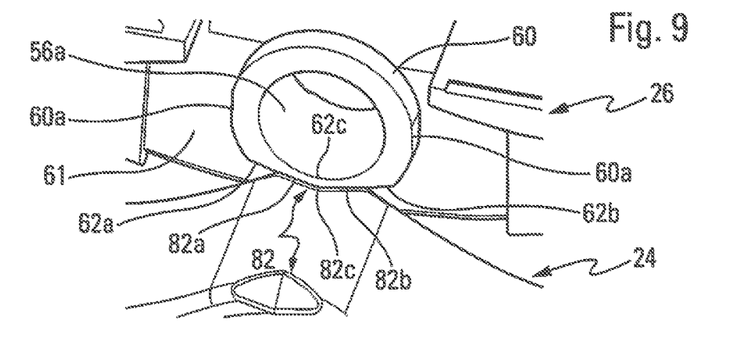

As may be seen in FIGS. 7 to 9, each protuberance 60 comprises at least one centring and guide means 62 that comprises at least two distinct and contiguous portions 62a, 62*b*. These portions form a truncated or chamfered part, in this case a lower part, of the adapter 26. Each centring and guide means 62 defines a ramp extending in an inclined plane relative to the lateral walls 42*a*, 42*b*. Each centring and guide means 62 defines at least one sliding surface, and, here, two sliding surfaces, intended to interact with the connector 24. The centring and guide means 62 of the protuberances 60 are inclined such that they diverge from one another from the top towards the bottom in order to form the distinct and contiguous portions. Their lower ends, located on the side opposite the upper wall 44, are spaced apart from one another by a distance L along the axis Y (FIG. 7). The lower end of each centring and guide means 62 extends at a short distance along the axis Y from the internal face of the corresponding lateral wall 42*a*, 42*b*, or may be directly connected to this internal lateral face delimiting the lateral wall in question, the distance along the axis Y then being equal to 0. In this latter case, the distance L is substantially equal to the distance between the internal lateral faces 61 and 62 delimiting the lateral walls 42*a*, 42*b* or to the width of the longitudinal space 45. Each centring and guide means 62, in particular the contiguous portions 62*a* and 62*b*, extends over an angular sector about the axis Y, representing an angle of between 30 and 150°, and preferably between 90 and 120°.

In the example shown, each ramp 62 has, in cross section, a form that is substantially an inverted V. As stated above, it comprises two contiguous and distinct portions 62*a*, 62*b*, each forming an adjacent sliding surface and being inclined relative to the other. The two portions 62*a*, 62*b* are, here, inclined relative to one another by an angle of between 190 and 330°, and preferably between 200 and 240°.

The contiguous and distinct portions 62*a*, 62*b* each have a general wing or D form. These portions are connected together by a substantially rectilinear cord 62*c*. This cord 62*c* has, here, in cross section, a convex curved form.

As may be seen, in particular, in FIG. 8, the centring and guide means 62 is formed by a chamfer located on an external annular ridge of the protuberance 60.

The portions 62*a*, 62*b* are symmetrical relative to a first median longitudinal plane perpendicular to the upper wall 44 and also relative to a second plane perpendicular to the first plane and to the wall 44 and passing via the axis Y (FIG. 7).

In an exemplary embodiment, each portion 62*a*, 62*b* is formed by a flat, i.e. a planar sector. Each flat thus forms a sliding surface facing the other centring and guide means formed on the other member, in particular the connector 24.

Naturally, the two flats of the connector 24 and/or of the adapter 26 are adjacent and inclined relative to one another.

Each protuberance 60 further comprises two diametrically opposed external flats 60*a* visible in FIGS. 8 and 9.

The lateral walls 42*a*, 42*b* of the body of the adapter 26 further comprise, on their external lateral faces, projecting means 54, 54*a* defining bearing faces in the transverse direction. At least some of these projecting means 54*a* are located at the level of the holes 56 and are traversed by these holes in the example shown.

The projecting means here comprise bands 54, 54*a* of material projecting from the external lateral faces of the lateral walls 42*a*, 42*b*. The bands of material have an elongate form and extend longitudinally between the lower and upper longitudinal edges of the walls 42*a*, 42*b*.

The bands 54, 54*a* of material define bearing faces that are substantially parallel. These bearing faces are, here, substantially parallel to the external lateral faces of the walls 42*a*, 42*b* and also to the longitudinal axis of the adapter 26.

The bands 54, 54*a* of material are spaced apart from one another in the longitudinal direction and distributed over the lateral walls 42*a*, 42*b* in the same direction. In the example shown, each lateral wall comprises four of said bands 54, 54*a* of material. The bands of material of one of the lateral walls are symmetrical relative to the bands of material of the other of the lateral walls, relative to a median longitudinal plane of the adapter substantially perpendicular to its upper wall 44.

The bands 54, 54*a* of material all have substantially the same thickness or dimension in the transverse direction. The bands 54*a* of material traversed by the holes 56 have a width or dimension in the longitudinal direction that is less than that of the other bands 54 of material and also less than the diameter of said holes 56.

The median transverse plane perpendicular to the upper wall 44 of the adapter 26 and passing via the axis Y traverses the bands 54*a* of material substantially at their middle and is a plane of symmetry of these bands. In other words, the bands 54*a* of material are substantially centred on the axis Y and the holes 56.

The adapter 26 described above is advantageously a unit, i.e. constituted by one and the same synthetic material. It may thus be manufactured in the course of a single moulding operation, particularly by means of injection-moulding.

The adapter 26 is fastened to the connector 24 by virtue of the protuberances 60 that form means for fastening the adapter to the connector and which can furthermore form means for pivoting of the adapter vis-à-vis the connector. The fastening means are of the elastic snap-fit type, the protuberances 60 of the adapter 26 being designed to interact by elastic snap-fitting with complementary means, for example one or more bearings, of the connector 24.

Figure 3:
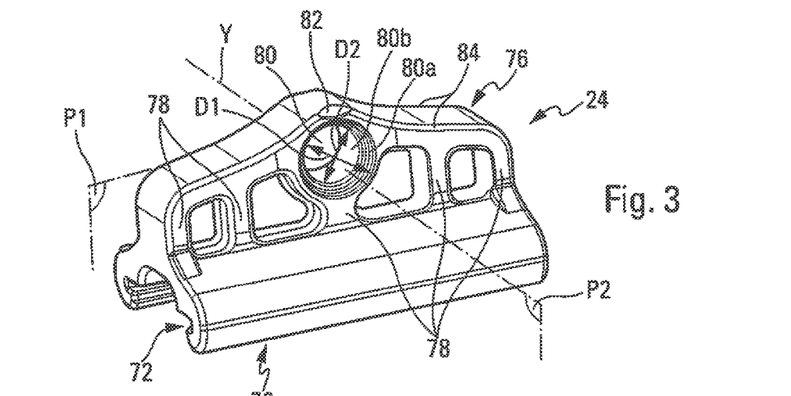
FIG. 3 is a schematic perspective view of a connector of the connection system of FIG. 2, FIGS. 4 and 5 are partial schematic views of the connector of FIG. 3 on a larger scale.
Figure 4:
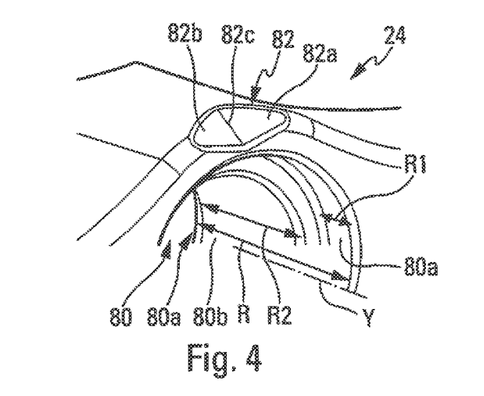
Figure 5:
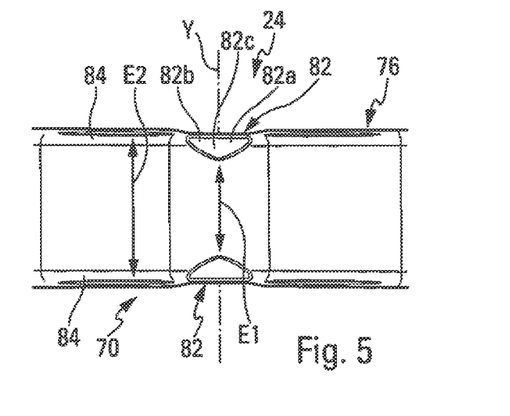

The connector 24, which can be better seen in FIGS. 3 and 5, is arranged so as to be rendered secure, for example by crimping, on the wiper blade 12. The connector 24 provides a 'complete' mechanical connection with the wiper blade 12, in the sense that there is no degree of freedom. The connector 24 may also provide a function of transporting and distributing a liquid for washing the vehicle windscreen.

The connector 24 comprises a base 70 extending longitudinally and transversely. This base 70 comprises a zone 72 of securing to the wiper blade 12 and, more particularly, to at least one vertebra 74 of this wiper blade. This zone 72 of securing has the form, for example, of a slit made in the base 70, this slit generating by two hooks capable of engaging on the wiper blade.

In the example shown, the wiper blade 12 comprises two parallel and coplanar vertebrae 74 spaced apart from one another in order to define a space for housing the squeegee blade 18. Each vertebra comprises a longitudinal edge opposite that which is in contact with the squeegee blade 18, which is received in the slit of the connector 24.

The base 70 is surmounted by a flank 76, for example, made as one with the base. This flank 76 has a transverse dimension that is less than that of the base and a longitudinal dimension substantially equal to that of the base. The flank 76 is, for example, centred on the base 70, in accordance with the axis Y. The flank 4 may have a plurality of ribs 78 that mechanically reinforce the flank.

The connector 24 and the adapter 26 are connected mechanically by a pivot connection. As far as the connector 24 is concerned, this pivot connection is implemented by a hole 80 made in the flank 76. This hole 80 extends in accordance with the axis Y. It traverses the flank 76. In other words, the hole 80 has a central axis centred on the axis Y.

Figure 10:
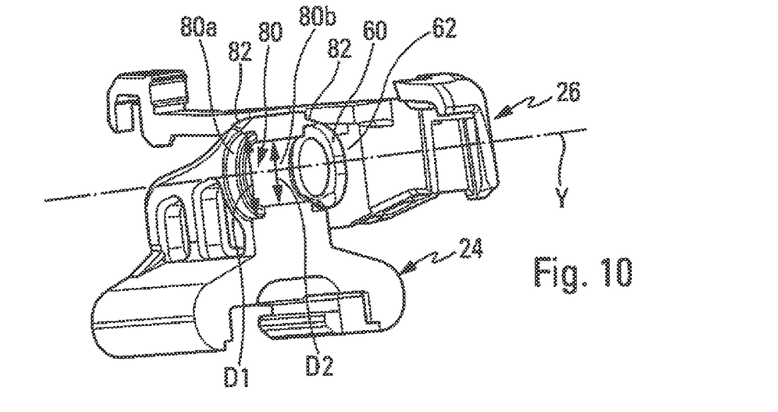
FIG. 10 is a schematic perspective and sectional view of the connection system of FIG. 2, and FIGS. 11 to 17 are schematic perspective views of the wiper blade of FIG. 2 and of different driving arms connected to the wiper blade by virtue of the connection system.

In the example shown, the hole 80 comprises adjacent portions 80a, 80b that are coaxial and of different diameters. The hole 80 comprises three portions: a lateral first portion 80a, a lateral second portion 80a and a median third portion 80b extending between the lateral portions 80a. The lateral portions 80a have an internal diameter D1 that is greater than the internal diameter D2 of the median portion 80b. The lateral portions 80a are circular sectors forming a bearing facing the protuberances 60 of the adapter 26. The ratio D2/D1 is, for example, between 0.6 and 0.9. The internal diameters D1 and D2 are also illustrated in FIG. 10.

The first lateral portion 80a comprises an internal cylindrical surface that comprises a longitudinal end, along the axis Y, that opens out on a lateral face of the flank 76 and is connected to this face by an annular edge, for example a convex rounded or chamfered edge, and an opposite longitudinal end connected via an annular surface that is substantially radial relative to the axis Y to an end of the median portion 80b.

Similarly, the second lateral portion 80a comprises an internal cylindrical surface that comprises a longitudinal end, along the axis Y, that opens out on the other lateral face of the flank 76 and is connected to this face by an annular edge, for example a convex rounded or chamfered edge, and an opposite longitudinal end connected via an annular surface that is substantially radial relative to the axis Y to the other longitudinal end of the median portion 80b. The first and second lateral portions 80a of the pivoting means formed on the connector 24 thus represent end portions of the hole 80, in accordance with the axis Y.

Each lateral portion 80a has a thickness R1 or dimension measured in accordance with the axis Y representing 5 to 25% of that R of the hole 80, measured in accordance with the same axis. The median portion has a thickness R2 or dimension measured in accordance with the axis Y representing 50 to 90% of that R of the hole.

The connector 24 described above is advantageously a unit, i.e. constituted by one and the same synthetic material. This connector may thus be manufactured in the course of a single moulding operation, particularly by means of injection-moulding.

The adapter 26 is mounted on the connector 24 by elastic snap-fitting of its protuberances 60 into the hole 80 of the connector, and more particularly into the lateral portions 80a constituting the hole 80. The centring and guide means 62 of the protuberances 60 of the adapter 26 interact with the connector in order to facilitate this mounting. The connector, meanwhile, also comprises centring and guide means 82 facilitating an insertion of the protuberances 60 of the adapter 26 in its hole 80.

Here, these means are provided on the flank 76 of the connector 24. In the present case, these means are notches 82 made in the lateral faces delimiting the flank 76 and in line with which the hole 80 terminates. It will be understood, here, that each notch 82 and the hole 80 are in the vicinity of one another, the notch 82 thus extending from a ridge 84 of the flank 76 as far as the orifice forming the hole 80, or substantially that far. In line with each notch 82, the flank 76 has a thickness E1 that is less than a thickness E2 of a portion of the flank 76 bordering said notch 82. These thicknesses E1, E2 are measured in accordance with a direction parallel to the axis Y. Thus formed, this notch 82 is delimited by two guide surfaces 82a. The contiguous and distinct portions 82a forming guide surfaces of the notches 82 complement, or substantially complement, those of the contiguous portions 62a, 62b of the means 62 formed on the protuberances 60 of the adapter 26.

In the example shown, each notch 82 has, in cross section, a form that is substantially an upright V. The contiguous portions 82a, 82b are adjacent and inclined relative to one another, in this case by an angle of between 30 and 170°, and preferably between 120 and 160°, in such a manner as to form a funnel that guides the protuberances 60 towards the hole 80.

The contiguous portions 82a, 82b are connected together by a rectilinear cord 82c that, here, in cross section, has a concave curved form, seen from the exterior of the connector 24. The portions or surfaces each have a general delta-wing form in the example shown.

The notches 82 are symmetrical relative to a first median plane P1 perpendicular to the axis Y. A second plane P2 perpendicular to said first plane passes substantially via the axis Y and in the middle of the notches (FIG. 3).

The assembly of the adapter 26 on the connector 24 takes place solely by means of vertical translation in accordance with an axis perpendicular to the upper wall 44 of the adapter, this translation being less damaging for the adapter by virtue of the presence of the one or more centring and guide means 62 and/or 82. In the course of this translation, the protuberances 60 of the adapter 26 engage in the notches 82 of the connector and their portions 62a, 62b interact with the portions 82a, 82b of the adapter 26 by sliding in order to centre and to guide this adapter on the connector. The aforesaid distance L is preferably greater than the thickness E1. Furthermore, the distance between protuberances 60, measured along the axis Y, is less than the width of the hole 80 and also the thickness E2.

Upon insertion of the protuberances 60 into the notches 82, the contiguous and distinct portions 62a and 62b bear on the surfaces 82a and 82b of the notches and the downward translation of the adapter 26 is continued such that the lateral walls 42a, 42b of the adapter are obliged to deform, with one separating from the other on account of the sliding of the ramps over the surfaces of the notches. This operation is continued until the protuberances 60 engage by means of elastic snap-fitting or return in the hole 80 of the connector and, more precisely, in the first lateral portion 80a and in the second lateral portion 80a of the hole 80. The adapter 26 is then fastened to the connector 24 and may, furthermore, pivot on same about the axis Y, by means of interaction of its protuberances with the internal cylindrical surfaces of the lateral portions 80a of the hole 80 (FIG. 10). The protuberances 60 may have an internal diameter that is less than or equal to that D2 of the median portion 80b of the hole 80, and an external diameter that is less than or equal to that D1 of the lateral portions 80a.

FIGS. 11 to 17 show several types of windscreen wiper arms that can be equipped with the adapter 26.

Figure 11:
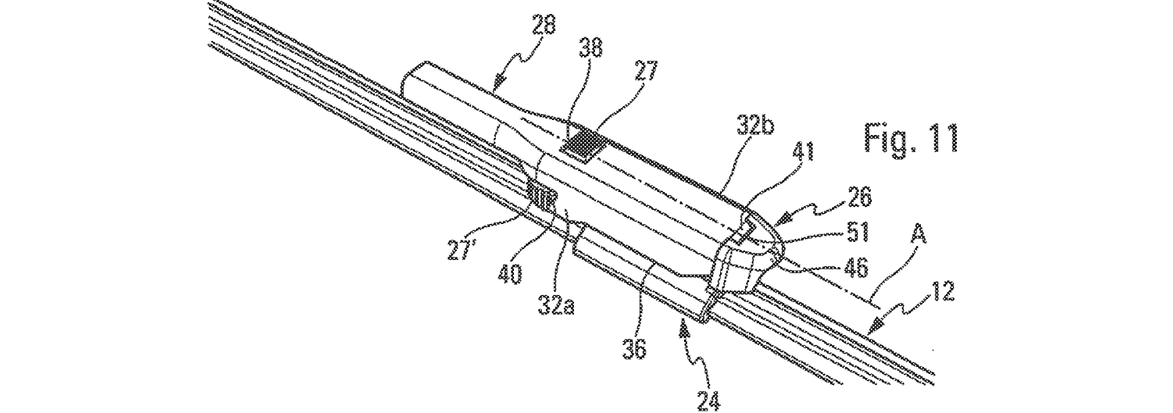
Figure 12:
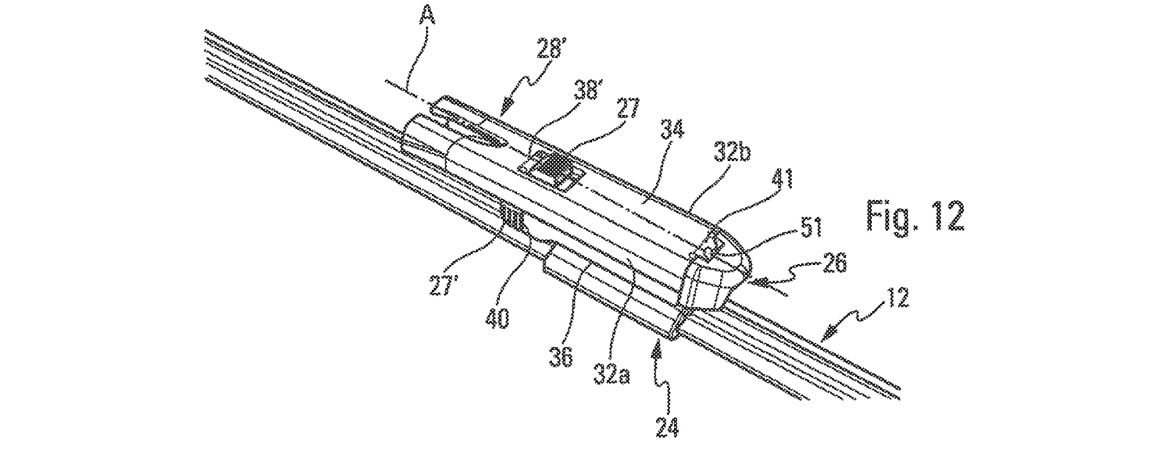

Reference is made, first, to FIGS. 11 and 12, which show, respectively, two terminal pieces 28, 28' of different driving arms.

Each terminal piece 28, 28' comprises two lateral legs 32a, 32b, the upper longitudinal edges of which are connected together by an upper transverse wall 34. Between them, the legs 32a, 32b and the wall 34 delimit a space for accommodating the adapter 26. The legs 32a, 32b may comprise, at the level of their lower longitudinal edges, means 36, such as folded edges or hooks turned towards the space delimited by the lateral legs, for retention of the adapter 26 in the aforesaid space.

The upper wall 34 comprises a through-aperture 38, 38' designed to receive the upper push button 27. In the mounted position, the push button 27 is accommodated in this aperture 38 and is able to pass through the latter so as to project from the upper face of the wall 34. Mounting of the push button 27 in the aperture 38 takes place by means of engagement or fitting, preferably by elastic snap-fitting.

The lateral walls 32a, 32b may each comprise a notch 40 of a shape complementing a lateral push button 27'. In the mounted position, the lateral push buttons 27' are accommodated in these notches 40 and are able to traverse them so as to project from the external faces of the walls 32a, 32b. Mounting of the push buttons 27' in the notches 40 takes place by means of engagement or fitting, preferably by elastic snap-fitting.

The terminal pieces 28, 28' are different. They have a U-form overall section but are different from one another in particular in terms of the dimensions and in terms of the shape and the size of their apertures 38, 38' or notches 40.

The upper walls 34 of the terminal pieces 28, 28' continue towards the exterior in order each to form a tab 41 with a longitudinal section substantially in the form of an S, which is configured in order to be engaged in the hole 51 of the adapter 26.

The terminal pieces 28, 28' have substantially the same external width. Furthermore, the ribs 54 of the external faces of the lateral walls of the body of the adapter 26 may be spaced from one wall to the other by a transverse distance substantially equal to the internal width of the transverse piece 28, 28', such that the terminal piece is wedged in the transverse direction by means of interaction of its legs with the lateral walls of the body of the adapter.

A description will now be given of the assembly of the adapter 26 on each of the terminal pieces 28, 28'.

The adapter 26 is engaged in the terminal piece 28, 28' by first inclining, in a plane perpendicular to the upper wall 44 of the adapter 26, the longitudinal axis of the adapter vis-à-vis the axis A of elongation of the terminal piece 28 then engaging the tab 41 of the terminal piece in the hole 51 of the adapter. Upon this engagement, the legs of the terminal piece start by sliding on the ribs 54 of the adapter. Furthermore, the front end edge of the upper wall of the terminal piece comes to bear on the upper rear face 48b of the head 46 of the adapter. The rear end of the adapter is then brought closer to the terminal piece until the lateral push buttons 27 engage by elastic snap-fitting in the notches 40 of the terminal piece 28, 28'. This bringing-closer may be achieved by rotation of the adapter 26 towards the terminal piece 28 or 28' about an axis passing along the upper rear face 48b, parallel to the axis Y. The front end edges of the lateral legs 32a, 32b of the terminal piece come to bear on the lateral rear faces 48a of the head 46 of the adapter. The axes of the adapter and of the terminal piece 28 are thus substantially parallel.

Figure 13:
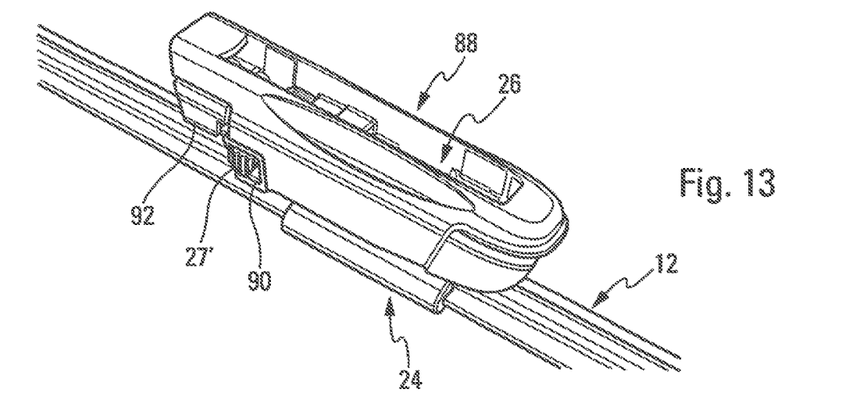
Figure 14:
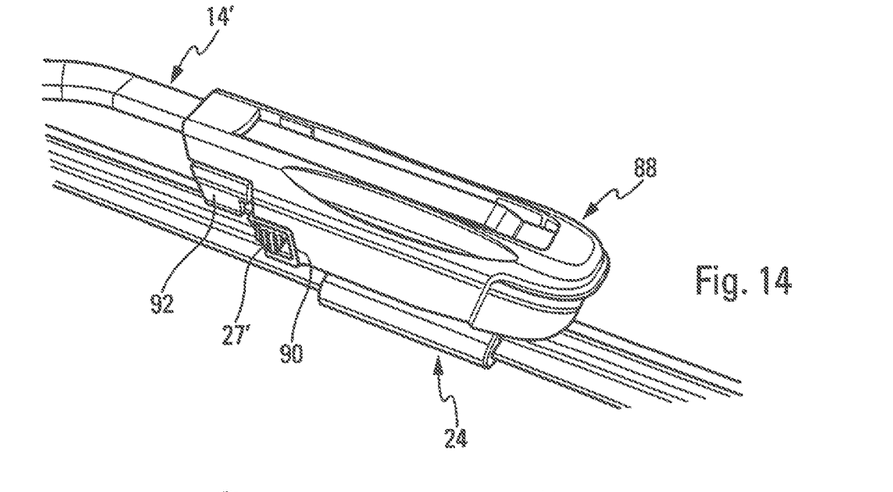

Reference is now made to FIGS. 13 and 14, in which the adapter 26 is connected to a windscreen wiper arm 14 of the rod arm type, i.e. an arm without a supplementary terminal piece, by means of a first connection member 88.

This connection member 88 is mounted on the adapter 26 and covers it fully in the example shown. It has an elongate form and comprises an internal housing in which the adapter 26 is mounted and retained. At its rear end, it comprises lateral notches 90 designed to receive the push buttons 27, respectively, by means of elastic snap-fitting.

The rod arm 14' comprises an end engaged in the connection member 88 over substantially the entire length thereof, from the rear longitudinal end of the member 88. The rod arm 14' is secured to the connection member 88 by appropriate means and may be detached from the member by actuation of push buttons 92 carried by the member and designed to interact with the end of the rod arm 14'.

Figure 15:
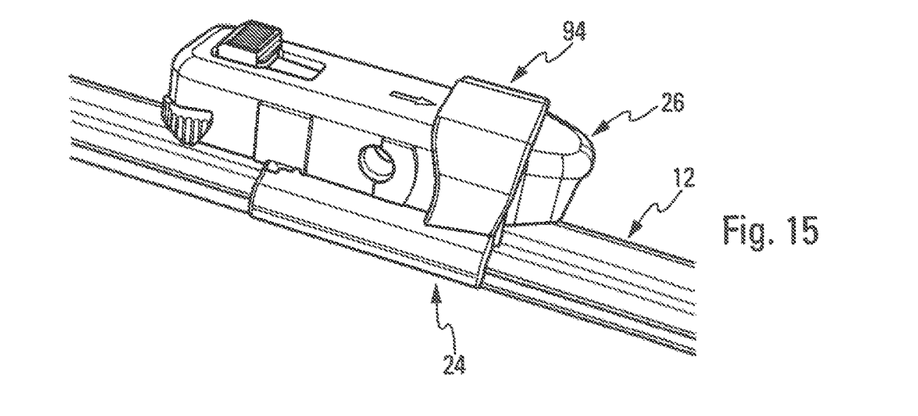
Figure 16:
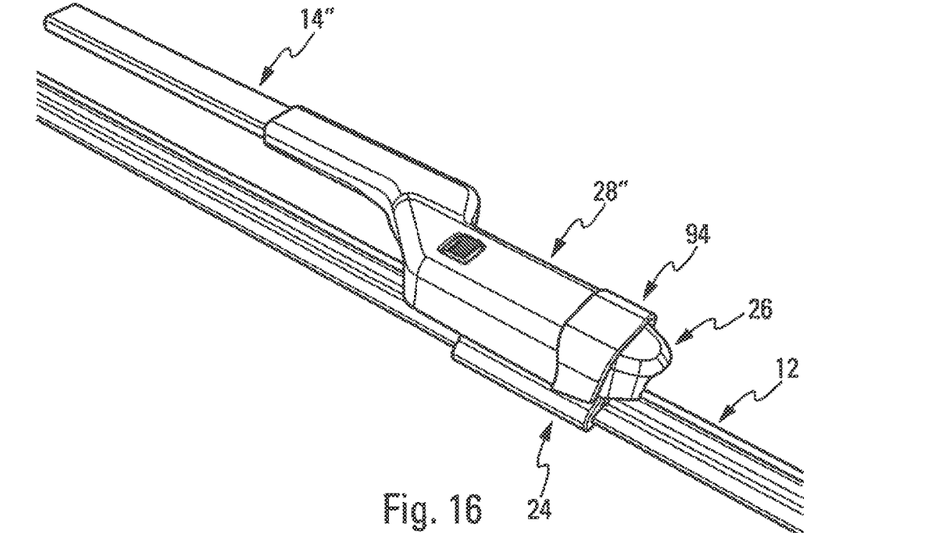
Figure 17:
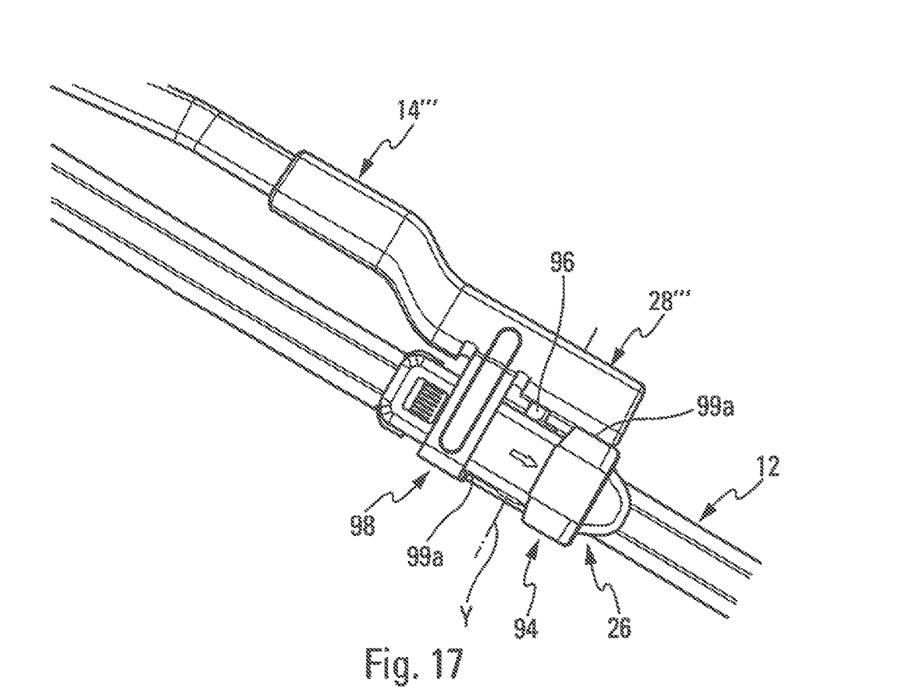

FIG. 15 shows a second connection member 94 that may be used to connect the adapter 26 to two other types of windscreen wiper arms, shown, respectively, in FIGS. 16 and 17.

The connection member 94 has a function similar to that of the adapter, i.e. to form the interface between the wiper blade and another type of terminal piece. This connection member 94 is designed to be mounted on the adapter in order to cover the latter at least in part. It is, in particular, used in order to be able to equip a windscreen wiper arm 14" provided with a broad terminal piece 28" with the adapter 26. The terminal piece 28" of the windscreen wiper arm 14" in FIG. 16 differs from those of FIGS. 11 and 12 particularly in that it is broader. The connection member 94 is configured in order to take up the clearances between the adapter 26 and the terminal piece 28" and in order to match the forms of these latter, being sandwiched between them. The terminal piece 28" is similar to those of FIGS. 11 and 12, except for the S form thereof in accordance with the longitudinal axis of the terminal piece.

The windscreen wiper arm 14''' of FIG. 17 is a windscreen wiper arm with lateral locking (a side-lock arm), the terminal piece 28''' of which comprises, first, a cylindrical rod 96 extending transversely on one side of the terminal piece and also a latch 98 in the form of an L extending transversely on the same side as the rod 96 and parallel to and at a distance from the latter.

The rod 96 is designed to traverse lateral holes of the member 94 that are aligned on the axis V and thus aligned with the holes 56 of the adapter 26 and the hole 80 of the connector. The rod 98 is engaged in these holes until its transverse piece 28''' bears on an external lateral face 99a of the member 94. The transverse piece 28''' is able to interact by sliding with the external lateral face 99a upon pivoting of the wiper blade vis-à-vis the windscreen wiper arm 14'''.

The L-latch 98 comprises a hook at its free end that is designed to interact by sliding with an opposite lateral face 99b of the member 94 upon pivoting of the wiper blade vis-à-vis the windscreen wiper arm 14''', and prevents accidental detachment of the wiper blade from the windscreen wiper arm during operation. Upon pivoting, the rod 96 may be guided by the internal cylindrical surfaces of the protuberances 60, and even, also, the internal cylindrical surface of the median part 80b of the hole.

The 'universal' adapter 26 may thus be combined with a plurality of types of driving arm.

The invention claimed is:

1. An assembly that connects a wiper blade to a windscreen wiper arm, the assembly comprising:
    an adapter capable of being connected to the windscreen wiper arm, the adapter comprising:
        two protuberances that face toward each other in opposing directions, wherein each of the two protuberances projects from an internal lateral face of the adapter, at least one of the two protuberances comprising a first centering and guide means,
        wherein the first centering and guide means are two contiguous first portions distinct from each other, each of the two first portions being a sloped, sliding surface extending in a plane that is inclined relative to lateral walls of the adapter; and
    a connector capable of being connected to the wiper blade, the connector comprising:
        a second centering and guide means complementing the first centering and guide means to facilitate the mounting of the connector to the adapter to allow for a rotation about at least one axis of articulation wherein the two first portions are adjacent and inclined relative to one another.

2. The assembly according to claim 1, wherein the first portions extend in distinct planes.

3. The assembly according to claim 1, wherein the first portions form a notch or a chamfer having a section substantially in the form of an upright or inverted V.

4. The assembly according to claim 1, wherein the first portions form at least one notch that is substantially in the form of an upright V, its two adjacent first portions being inclined relative to one another by an angle between 200° and 160°.

5. The assembly according to claim 1, wherein the first portions form at least one chamfer that is substantially in the form of an inverted V, its two adjacent first portions being inclined relative to one another by an angle between 200° and 240°.

6. The assembly according to claim 1,
wherein said second centering and guide means are two distinct and contiguous second portions, and
wherein said second portions are located on a ridge of the connector.

7. The assembly according to claim 1, wherein:
each of the two protuberances comprises a first centering and guide means,
each centering and guide means are two distinct and contiguous first portions, and
the two distinct and contiguous first portions are symmetrical relative to a first, longitudinal median plane of the adapter.

8. The assembly according to claim 7, wherein the two distinct and contiguous first portions are symmetrical relative to a second, transverse median plane of the adapter.

9. The assembly according to claim 8, wherein the first plane is perpendicular to the at least one axis of articulation and the second plane is perpendicular to a longitudinal axis of the wiper blade.

10. The assembly according to claim 1, wherein the centering and guide means comprise solely two distinct and contiguous first portions.

11. A system for connecting a wiper blade to a windscreen wiper arm, comprising:
two members, one of which is configured to be secured to said wiper blade and the other is configured to be secured to said windscreen wiper arm, wherein one of the members is a connector and the other is an adapter as claimed in claim 1.

12. The assembly according to claim 1, wherein the first portions are oriented in a horizontal "V" shape relative to the lateral walls of the adapter.

* * * * *